United States Patent
Wiltgen et al.

(10) Patent No.: US 11,451,551 B2
(45) Date of Patent: *Sep. 20, 2022

(54) SYSTEM FOR LICENSING MOBILE APPLICATIONS, FEATURES, AND DEVICES

(71) Applicant: Kyocera Corporation, Kyoto (JP)

(72) Inventors: Charles Wiltgen, Encinitas, CA (US); Lisa LeVasseur, Los Angeles, CA (US); Kotaro Matsuo, Poway, CA (US)

(73) Assignee: Kyocera Corporation, Kyoto (JP)

( * ) Notice: Subject to any disclaimer, the term of this patent is extended or adjusted under 35 U.S.C. 154(b) by 303 days.

This patent is subject to a terminal disclaimer.

(21) Appl. No.: 16/891,576

(22) Filed: Jun. 3, 2020

(65) Prior Publication Data

US 2020/0296104 A1  Sep. 17, 2020

Related U.S. Application Data

(63) Continuation of application No. 13/785,200, filed on Mar. 5, 2013, now Pat. No. 10,693,876, which is a
(Continued)

(51) Int. Cl.
*H04L 9/40* (2022.01)
*G06Q 30/06* (2012.01)

(52) U.S. Cl.
CPC ............. *H04L 63/10* (2013.01); *G06Q 30/06* (2013.01)

(58) Field of Classification Search
CPC ................................ H04L 63/10; G06Q 30/06
(Continued)

(56) References Cited

U.S. PATENT DOCUMENTS 4,819,267 A  4/1989 Cargile et al.
5,579,222 A  11/1996 Bains et al.
(Continued)

FOREIGN PATENT DOCUMENTS

WO     2005107115 A2     11/2005
WO     WO-2006074284 A2 *  7/2006  ............. G06Q 10/00

OTHER PUBLICATIONS

DRM Specification Candidate Version 2.0—Sep. 15, 2005 (DRM Specification Candidate Version 2.0—Sep. 15, 2005, Open Mobile Alliance, OMA-TS-DRM-DRM-V2_0-20050915-C, 144 pages (Year: 2005).*
(Continued)

*Primary Examiner* — James D Nigh

(57) ABSTRACT

A system for licensing an application or feature for use on a wireless mobile device is disclosed. The wireless device is provided to a user with a licensable application or feature, but the application or feature has not been fully authorized for use. When the wireless device receives a request to use the application or feature, the device operates the requested application or feature, and generates an irrevocable license request. The license request is transmitted to a license server at a time convenient for the device. The license server generates a license certificate to the application or feature, and transmits the license certificate to the wireless mobile device. The device receives the license certificate, which is stored in local memory. The application or feature is now fully licensed for future operation on the wireless mobile device. The license server operates accounting processes to generate license reports and license accounting information.

9 Claims, 6 Drawing Sheets

Related U.S. Application Data continuation of application No. 11/344,697, filed on Jan. 31, 2006, now Pat. No. 8,417,641.

(58) Field of Classification Search
USPC .......................................................... 705/59
See application file for complete search history.

(56) References Cited

U.S. PATENT DOCUMENTS

| | | | |
|---|---|---|---|
| 6,049,789 | A | 4/2000 | Frison et al. |
| 6,920,567 | B1 | 7/2005 | Doherty et al. |
| 6,993,664 | B2 | 1/2006 | Padole et al. |
| 7,184,759 | B2 | 2/2007 | Date et al. |
| 7,703,142 | B1 | 4/2010 | Wilson et al. |
| 2002/0102998 | A1 | 8/2002 | Lin |
| 2002/0116615 | A1 | 8/2002 | Nguyen et al. |
| 2002/0174356 | A1* | 11/2002 | Padole .................... G06F 21/10 726/26 |
| 2002/0198846 | A1 | 12/2002 | Lao |
| 2003/0084145 | A1 | 5/2003 | Ramachandran et al. |
| 2003/0135380 | A1 | 7/2003 | Lehr et al. |
| 2004/0088175 | A1* | 5/2004 | Messerges .............. G06F 21/10 726/10 |
| 2004/0167859 | A1 | 8/2004 | Mirabella |
| 2004/0225605 | A1 | 11/2004 | Rowe |
| 2005/0038752 | A1 | 2/2005 | Gaetano et al. |
| 2005/0204405 | A1 | 9/2005 | Wormington et al. |
| 2006/0111920 | A1* | 5/2006 | Jacobs ................... G06Q 10/00 705/902 |
| 2006/0236382 | A1 | 10/2006 | Hinton et al. |
| 2007/0033419 | A1* | 2/2007 | Kocher ............ G11B 20/00086 713/193 |
| 2007/0074050 | A1 | 3/2007 | Camiel |
| 2008/0215468 | A1* | 9/2008 | Monsa-Chermon ... G06Q 30/04 705/400 |

OTHER PUBLICATIONS

Open Mobile Alliance, "DRM Specification Candidate Version 2.0—Sep. 15, 2005", OMA-TS-DRM-DRM-V2_0-20050915-C, Sep. 15, 2005, US.

Liu et al., "Digital Rights Management for Content Distribution", Australian Computer Society, Australasian Information Security Workshop 2003, 2003, Wollongong, AU.

Brander et al., "RFC 4355—IANA Registration for Enumservices email, fax, mms, ems, and sms", Internet Engineering Task Force, Jan. 2006, US.

\* cited by examiner

SYSTEM FOR LICENSING MOBILE APPLICATIONS, FEATURES, AND DEVICES

RELATED APPLICATIONS

This application is a continuation application of U.S. patent application entitled "SYSTEM FOR LICENSING MOBILE APPLICATIONS, FEATURES, AND DEVICES", Ser. No. 13/785,200 and filed on Mar. 5, 2013, which is a continuation application of U.S. patent application entitled "SYSTEM FOR LICENSING MOBILE APPLICATIONS, FEATURES, AND DEVICES", Ser. No. 11/344,697 and filed on Jan. 31, 2006; all of which are assigned to the assignee hereof and hereby expressly incorporated by reference in their entirety.

FIELD OF THE INVENTION

The present invention relates generally to the field of wireless communication devices, and, more particularly, to a wireless mobile unit operating licensable mobile applications and selectable features.

BACKGROUND OF THE INVENTION

Wireless communication devices are widely used, and have become an essential aspect of modern life. Wireless communication devices such as pagers, mobile phones, text pagers, PDAs (personal data assistants), and PMPs (portable media players) are used for work, for personal activities, for entertainment, and as a way to keep in contact with family and friends. These wireless devices are increasingly available in cars, boats, appliances, and entertainment equipment. As the number and type of these wireless devices increase, application developers continue to provide exiting and innovative applications to make the wireless devices easier to use, and to enhance their usefulness.

These wireless devices most often access a wireless network according to well defined and well established air interfaces or standards. For example, wireless handsets may operate according to the CDMA, WCDMA, UMTS, CDMA2000, GSM, EDGE, PHS, AMPS, Wi-Fi, WiMax, or other standard. Wireless communications systems generally have base stations and antennas which communicate with mobile wireless devices. These wireless devices may accommodate voice communication as well as data communication.

Consumers are continually requesting more advanced features on mobile devices, while at the same time expecting stable or even reduced costs. This demand for features, coupled with cost pressures, puts tremendous pressure on wireless carrier companies and device manufacturers to provide accessibility to advanced features, but without unduly burdening the cost of the wireless devices. To control costs, wireless device manufacturers may attempt to reduce the number of available models, thereby allowing for the cost advantages of large scale manufacturing. However, to appeal to a wide range of consumers, each device model will have a wide range of installed and active features. For example, a typical wireless handset may include a camera, video capture capability, sound file capture, audio (i.e. MP3, AAC, etc.) player capability, and image manipulation functions. Many consumers will never use some of these features, and some users may only use the handset for its voice capability. However, some of these features are provided pursuant to paid licenses. In one example, a license fee may be paid for including an MP3 decoder in a wireless handset.

In a typical license arrangement, the fee is paid for every device sold, irrespective of whether or not the decoder is actually ever used. This arrangement seems unfair to the wireless carrier and device manufacturers, and unnecessarily adds cost to wireless devices. However, no viable alternative licensing system has yet to be provided.

In this regard, pay-per-use arrangements have been tried, but consumers typically expect that features, such as MP3 decoders, are provided with fully paid up licenses. Also, it has been suggested that consumers register to obtain rights to use certain features, but carriers and manufacturers are unlikely to implement any license process that adds a burden to the consumer. More particularly, consumers are less likely to purchase, or repurchase from the same carrier or manufacturer, if the consumer perceives that the provided features were difficult to activate. Therefore, there exists a need for a licensing arrangement that is transparent to the consumer, but enables an accurate and fair implementation of a licensing program.

SUMMARY OF THE INVENTION

Briefly, the present invention provides a system for licensing an application or feature for use on a wireless mobile device. The wireless mobile device is provided to a user with a licensable application or feature, but the application or feature has not been fully authorized for use. When the wireless device receives a request to use the application or feature, the wireless device operates the requested application or feature, and generates an irrevocable license request. The license request is transmitted to a license server at a time convenient for the wireless device. The license server generates a license certificate to the application or feature, and transmits the license certificate to the wireless mobile device. The wireless device receives the license certificate, which is stored in local memory. Accordingly, the application or feature is now fully licensed for future operation on the wireless mobile device. The license server operates accounting processes to generate license reports and license accounting information.

In one particular example, a wireless handset is sold to a user with a licensable MP3 decoder. When the user requests that the handset play an MP3 encoded song, the handset uses the MP3 decoder to play the song, and also generates an irrevocable license request. Immediately, or at a later time if wireless communication was not immediately available, the MP3 license request is transmitted to an MP3 license server, which confirms that the handset is authorized to receive an MP3 license. The license server generates an MP3 license certificate to the MP3 decoder and transmits the license certificate to the handset. The handset receives the license certificate, which is stored in local memory. Accordingly, the MP3 decoder is now fully licensed for future operation on the handset. The license server operates accounting processes to generate license reports and license accounting information.

Advantageously, the system for licensing enables a user to seamlessly access and use available technologies, while allowing the handset manufacturer or wireless carrier company to pay only for necessary licenses. Further, license usage is fully documented and managed, to assure that license holders are fully paid, and that licenses are properly administered.

The present invention further relates to machine readable media on which are stored embodiments of the present invention. It is contemplated that any media suitable for storing instructions is within the scope of the present invention. By way of example, such media may take the form of magnetic, optical, or semiconductor media. The invention also relates to data structures that contain embodiments of the present invention, and to the transmission of data structures containing embodiments of the present invention.

These and other features of the present invention will become apparent from a reading of the following description, and may be realized by means of the instrumentalities and combinations particularly pointed out in the appended claims.

BRIEF DESCRIPTION OF THE SEVERAL VIEWS OF THE DRAWINGS

The drawings constitute a part of this specification and include exemplary embodiments of the invention, which may be embodied in various forms. It is to be understood that in some instances various aspects of the invention may be shown exaggerated or enlarged to facilitate an understanding of the invention.

DETAILED DESCRIPTION

Figure 1:
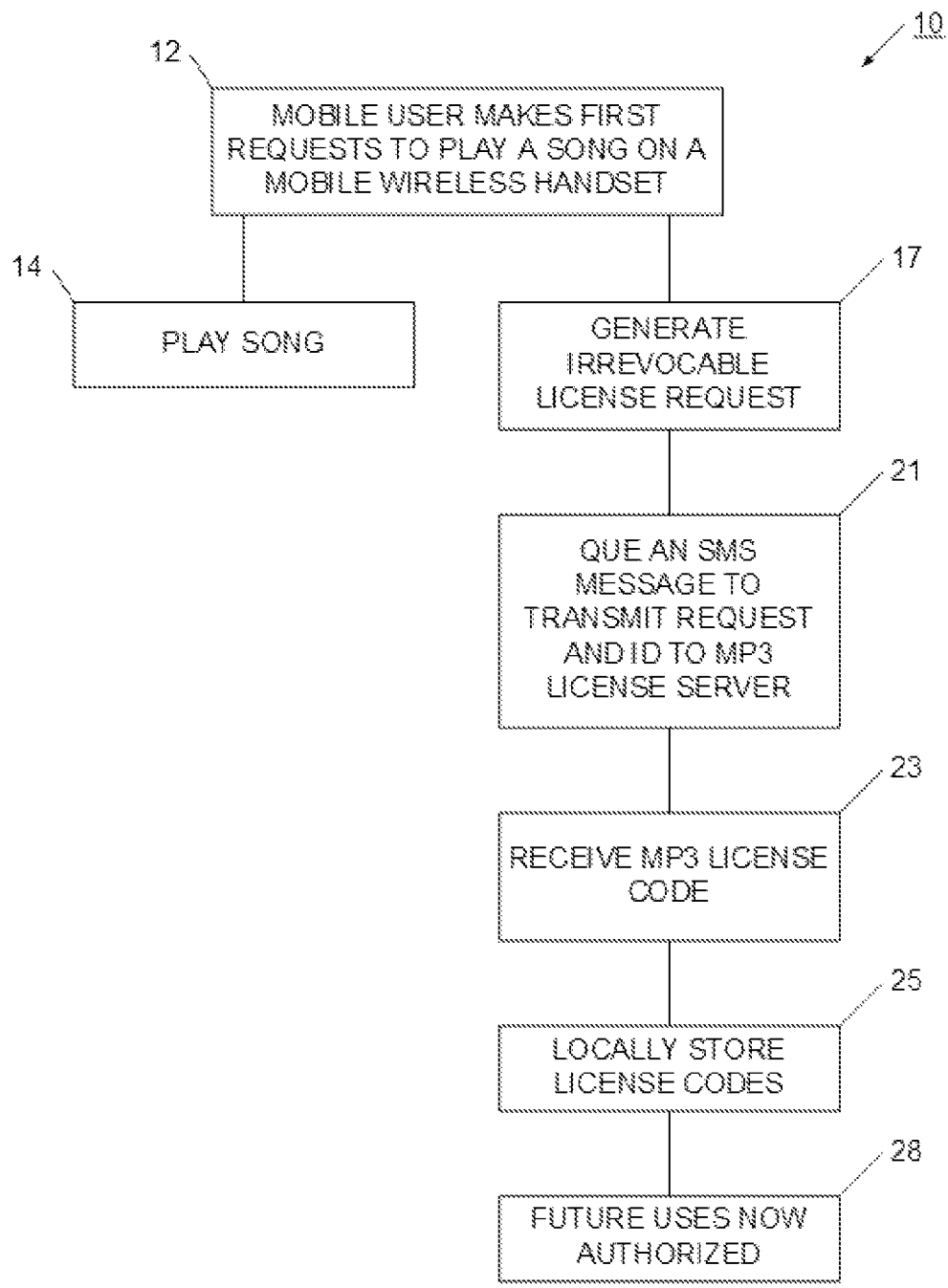
FIG. 1 is a flowchart of a process for licensing a mobile MP3 device in accordance with the present invention.

Referring now to FIG. 1, method 10 for licensing an application is illustrated. Method 10 operates on a wireless mobile device. For example, the wireless mobile device may be a wireless handset, a personal data assistant, a portable computer, or a wireless module that is integrated into a larger device. A wireless module is constructed to be integrated into a larger device and system, and brings wireless conductivity to the larger device. In one example, a wireless module is included in a vehicle, which enables voice and data conductivity through a wireless infrastructure system. It will be appreciated that the wireless mobile device may take alternative forms.

The mobile wireless device has been manufactured to include an MP3 decoder. Although method 10 will be described with reference to an MP3 application or feature, it will be appreciated that other applications or features may be used. For example, video, position location, browser, gaming, and accessory features and applications may also be used. The MP3 decoder may be provided in hardware, firmware, software or any combination of hardware and software. The MP3 decoder enables the wireless mobile device to play audio files compressed according to the MP3 standard. However, not all the handsets manufactured with MP3 capability will actually be used to play MP3 files. Accordingly, the wireless mobile device is provided to the user with a licensable version of the MP3 decoder. As a licensable application module, the MP3 decoder is present on the wireless mobile device, but full license fees may not have been paid to license holders.

One or more owners of intellectual property claim intellectual property rights in the MP3 decoder technology. Accordingly, the owners of the underlying MP3 technology desire to be paid a licensing fee for use of MP3 decoders. The payment of license fees is relatively straightforward when a device has a single or primary use. For example, a portable MP3 player is primarily used for playing MP3 files. In this way, it makes economic sense that an MP3 license is purchased for each MP3 player that is sold. However, MP3 capability is being added to a wide variety of devices. For example, a mobile wireless handset has its primary purpose of establishing voice and data conductivity through a wireless infrastructure. To make mobile handsets more attractive to consumers, manufacturers have added additional features, such as the ability to play MP3 files. However, many of the mobile wireless handsets will never be used as MP3 players, or a user may have the wireless handset for considerable time before first using the MP3 capability. In this regard, it adds additional cost to the handset and an additional burden to the handset manufacturer to pay for an MP3 license for all handsets sold. To facilitate a fair and accountable licensing system, method 10 provides the wireless mobile device with an MP3 decoder, but does not provide a prepaid license for that decoder. In this way, the manufacturer of the mobile device has not had to incur the expense of paying a license fee for including the MP3 decoder in the available feature set for the wireless device. As will be more fully described below, the licensing fee becomes due upon the MP3 decoder's use.

When the mobile user first makes a request to play a song on the mobile wireless handset as shown in block 12, the mobile wireless handset proceeds to play the song using the licensable MP3 decoder as shown in block 14. Concurrent with initiating playing of the song, the wireless mobile handset generates an irrevocable license request as shown in block 17. Since the mobile user has activated the MP3 decoder, any license fees due for that activation must now be paid. The license request is formatted as an SMS text message directed to an MP3 license server, as shown in block 21. The queued message will then be transmitted to the license server when a communication air interface is available. In some cases, the air interface will be immediately available, and in other cases the message may be sent at a later time. In this way, the user may continue to enjoy use of the MP3 player, even when the wireless device is not able to immediately contact the MP3 licensing server. It will be appreciated that the air interface may be established on an available communication radio, such as a CDMA, WCDMA, CDMA 2000, UMTS, GSM, PHS, Wi-fi, Wi-Max, or PCS communication radio. It will be appreciated that existing or evolving communication standards may be used, or proprietary commercial or governmental air interfaces may be used.

Once an air interface has been established, the SMS message is transmitted to the license server. The license server may be operated by the wireless carrier operator, or may be operated by the handset manufacturer. For other types of licensable applications, the server may be controlled or operated by another entity. The license server confirms that the mobile wireless handset making the request is authorized to obtain a license. Upon confirming that the license may be properly sent, the license server generates a license certificate and transmits the license certificate to the mobile wireless handset. In one example, the license certificate is a license code at least in part derived from the device ID of mobile wireless handset. In this way, the transmitted license is usable only on the one mobile wireless handset, and a full accounting record is available of licensed units.

The license certificate is received at the wireless mobile unit, typically through the SMS transport system. The mobile wireless handset locally stores the license code or license certificate as shown in block 25. In this way, future uses of the MP3 decoder are authorized without need for further activation steps.

Advantageously, the local user was able to activate and license the MP3 decoder without delay, input, or additional cost. In this way, the user experience is consistent with prior pre-paid licensing systems. However, the handset manufacturer and the carrier have been relieved of the burden of paying for MP3 licenses for all manufactured systems. Instead, the manufacturer or carrier only pays for MP3 decoder licenses that are as actually used by consumers. This more fairly implements a licensing program, while assuring the holders of intellectual property proper payment for their technologies. Although method 10 has been described with reference to an MP3 decoder, it will be appreciated that other licensable application modules may be used.

Figure 2:
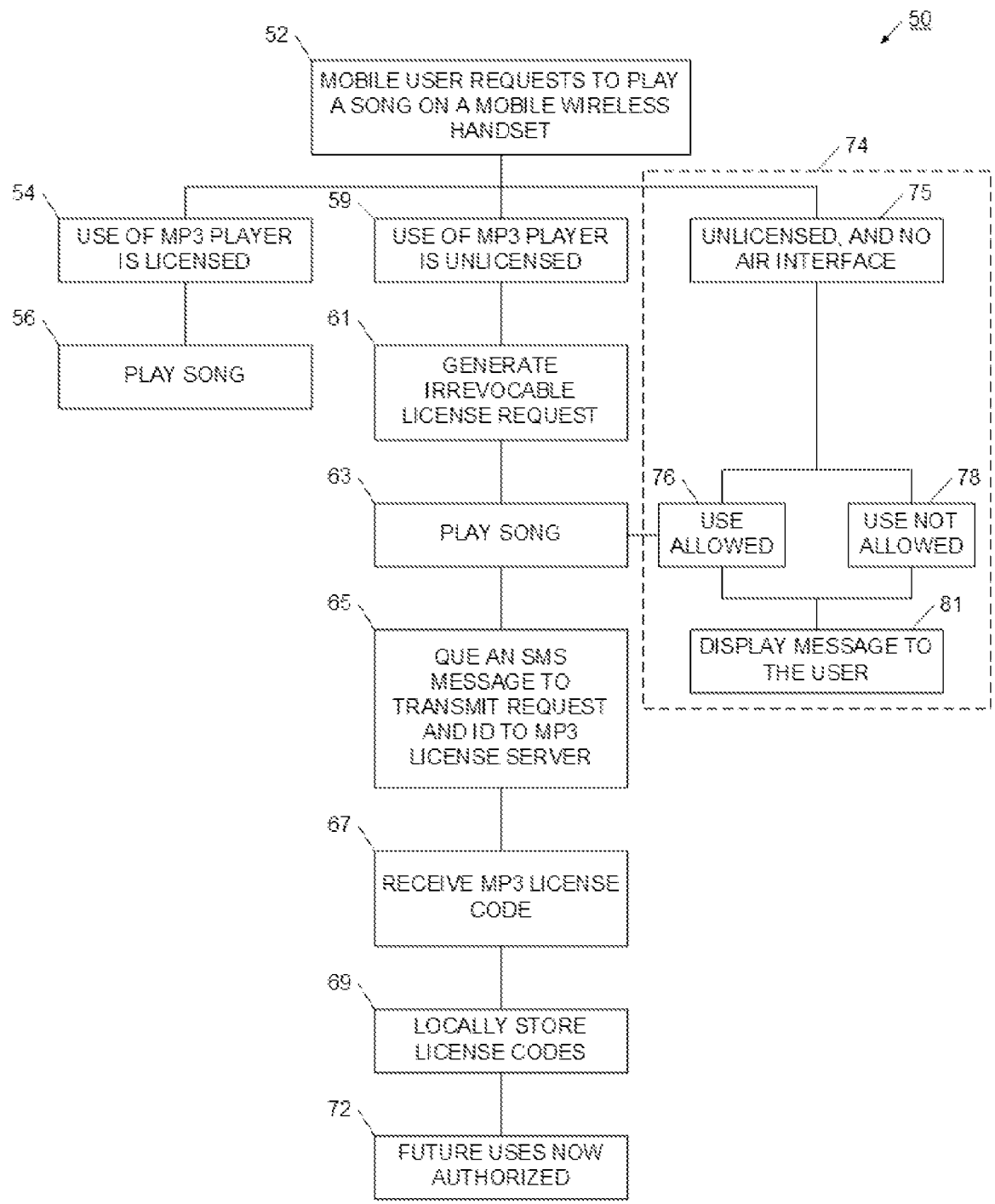
FIG. 2 is a flowchart of a process for licensing a mobile MP3 device in accordance with the present invention.

Referring now to FIG. 2, a method for licensing an application module is illustrated. Method 50 operates on a mobile wireless handset having a licensable MP3 player. More particularly, the mobile wireless handset has the MP3 decoder functionality available for use, but a fully paid license has not been obtained for the MP3 decoder. A mobile user makes a request to play an MP3 song on the mobile wireless handset as shown in block 52. The mobile wireless handset first determines if the MP3 player has already obtained a license certificate. If a license certificate has been obtained as shown in block 54, then the song is normally played as shown in block 56. However, if no license has been obtained as shown in block 59, then the mobile wireless handset generates an irrevocable license request as shown in block 61. Since the mobile wireless handset is now irrevocably proceeding to obtain a paid license, the mobile wireless handset activates the MP3 decoder and plays the requested song as shown in block 63. In this way, the user is unaware that a license is being obtained, thereby maintaining expected consumer performance. The license request is queued as an SMS message and routed to an MP3 license server as shown in block 65. For accounting and security purposes, the SMS message may include the unique device ID of the mobile wireless handset. Although method 50 has been described using SMS as the message transport system, it will be appreciated that other transport systems may be used. The license server confirms that the mobile wireless handset is authorized to receive a license, and communicates a license certificate back to the mobile wireless handset. The license certificate may be sent via the SMS system, and is received by the mobile wireless handset as shown in block 67. The wireless handset then stores the license certificate as shown in block 69, thereby enabling future use of the MP3 decoder without taking further licensing steps as shown in block 72.

It will be appreciated that a mobile wireless handset may at times operate in geographies and positions where an air interface is not obtainable for an extended period of time, and therefore the wireless device and MP3 licensing server can not communicate. For example, some phones may allow its communication radio to be disabled during airplane flights, while still allowing other functions such as schedulers, to do tasks, and MP3 players to operate. In another example, phones may be taken to geographies where authorized carriers do not operate. In these instances, a consumer may still desire to use the non-radio functions, such as the MP3 player. To facilitate extended use when no air interface is available, process 74 is used to supplement method 50. It will be understood that process 50 may be operated in way that allows a period of time to pass from when the MP3 player is first used and when the license request is made to the MPS licensing server. This timer period may be set, for example, to a few minutes, or for several days. It will be appreciated that the specific time period allowed may be set according to application, network, licensor, and device requirements. If the time period runs out, then the right to use the MP3 may be revoked, but the license request is still irrevocable.

Process 74 is used when the mobile user has requested to use the MP3 player, but no air interface is obtainable for an extended period. As shown in block 75, the process 74 begins with a determination that the MP3 decoder is currently unlicensed and it is not possible to transmit a license request over an air interface. Accordingly, the mobile wireless handset may include a temporary use indicator that allows for use of the MP3 player even when no air interface is obtainable. In one example, the temporary indicator is a counter which counts the number of times the MP3 decoder has been activated without license, or may track the total number of minutes the MP3 decoder is used without full license. If use is allowed, as shown in block 76, then the song will be allowed to play normally as shown in block 63. However, if use is not allowed as shown in block 78, then a message may be displayed to the user as shown in block 81. The message could indicate, for example, that the user must move to a place where an air interface is obtainable before being able to use the MP3 player.

Figure 3:
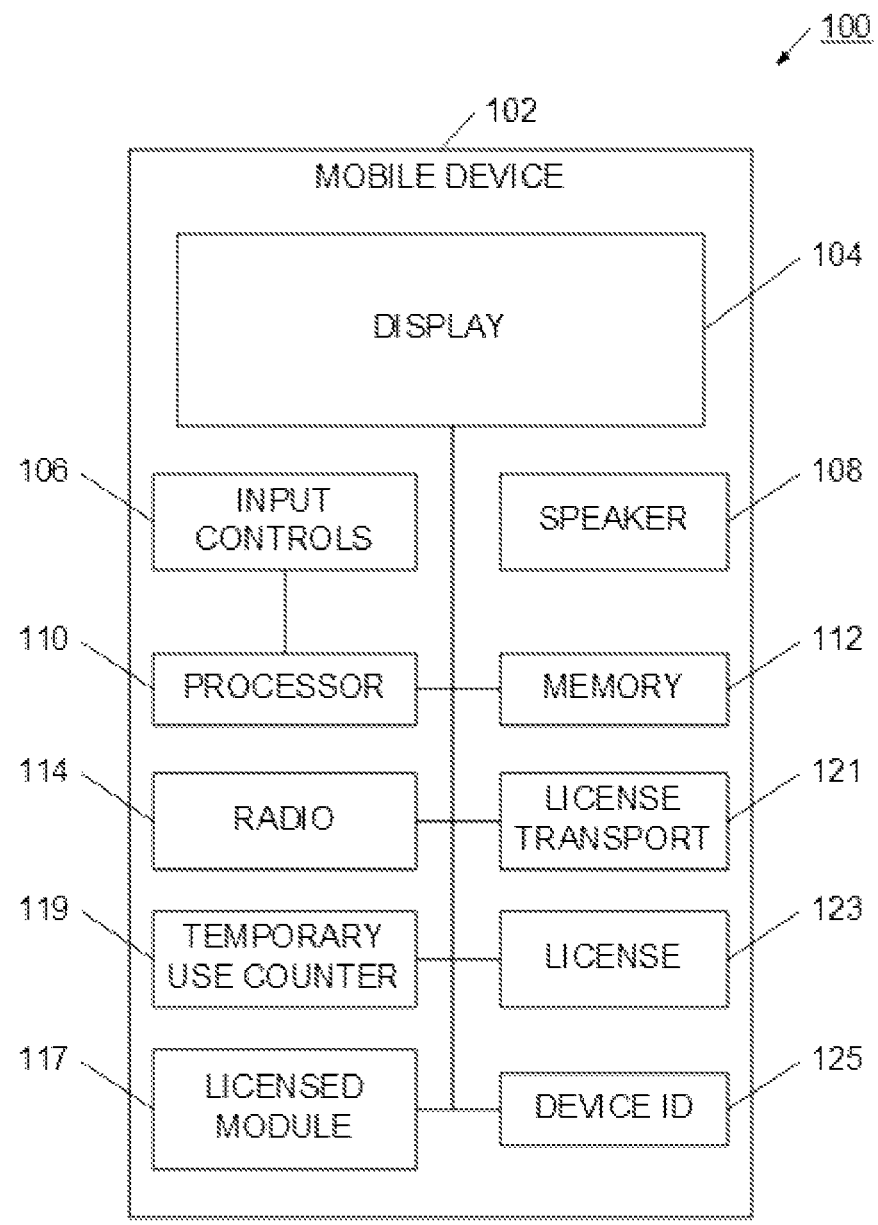
FIG. 3 is a block diagram of a wireless device having a licensable module in accordance with the present invention.

Referring now to FIG. 3, wireless device 100 is illustrated. Wireless device 100 includes housing 102 constructed and sized for portability. Housing 102 includes textual or graphical display 104, input controls 106, and speaker 108. The construction and design of mobile handsets is known and, for brevity, will not be described in detail herein. Further, it will be appreciated that some modules and components have been removed from FIG. 3 to facilitate ease of explanation. Mobile handset 102 also includes processor 110 for operating call processing and application functions. Processor 110 cooperates with memory 112 in providing these call processing and application functions. Memory 112 may also be used, for example, for storing MP3 audio files. Wireless handset 100 also includes radio 114 for establishing a communication link through infrastructure. Radio 114 may comply with one or more communication standards.

Mobile wireless handset 100 also includes licensed module 117. In one example, licensed module 117 is an MP3 decoder system. It will be understood that the MP3 decoder may be provided as hardware, firmware, software, or a combination. It will also be understood that licensed module 117 may provide other types of functionality and application support. For example, licensed module 117 may be video, audio, gaming, or position location applications. Licensed module 117 is provided to the consumer in a licensable form. That is, the module is constructed for immediate use, but the manufacturer or carrier has not paid for an operational license. Accordingly, when a user first activates licensed module 117, radio 114 uses license transport 121 to request a full license to use licensed module 117. In one example, license transport 121 is an SMS transport system. It will be appreciated that other transport systems may be used.

In communicating with a license server, device ID 125 may be communicated as part of the license request. It will also be appreciated that the license certificate generated by the license server may use device ID 125 as part of the algorithm to generate the license certificate. When the license certificate is received through license transport 121, the license certificate is locally stored as shown in block 123. Thereby, when the user desires to use the license module another time, the license information is stored locally, so additional licensing steps are not needed.

Figure 4:
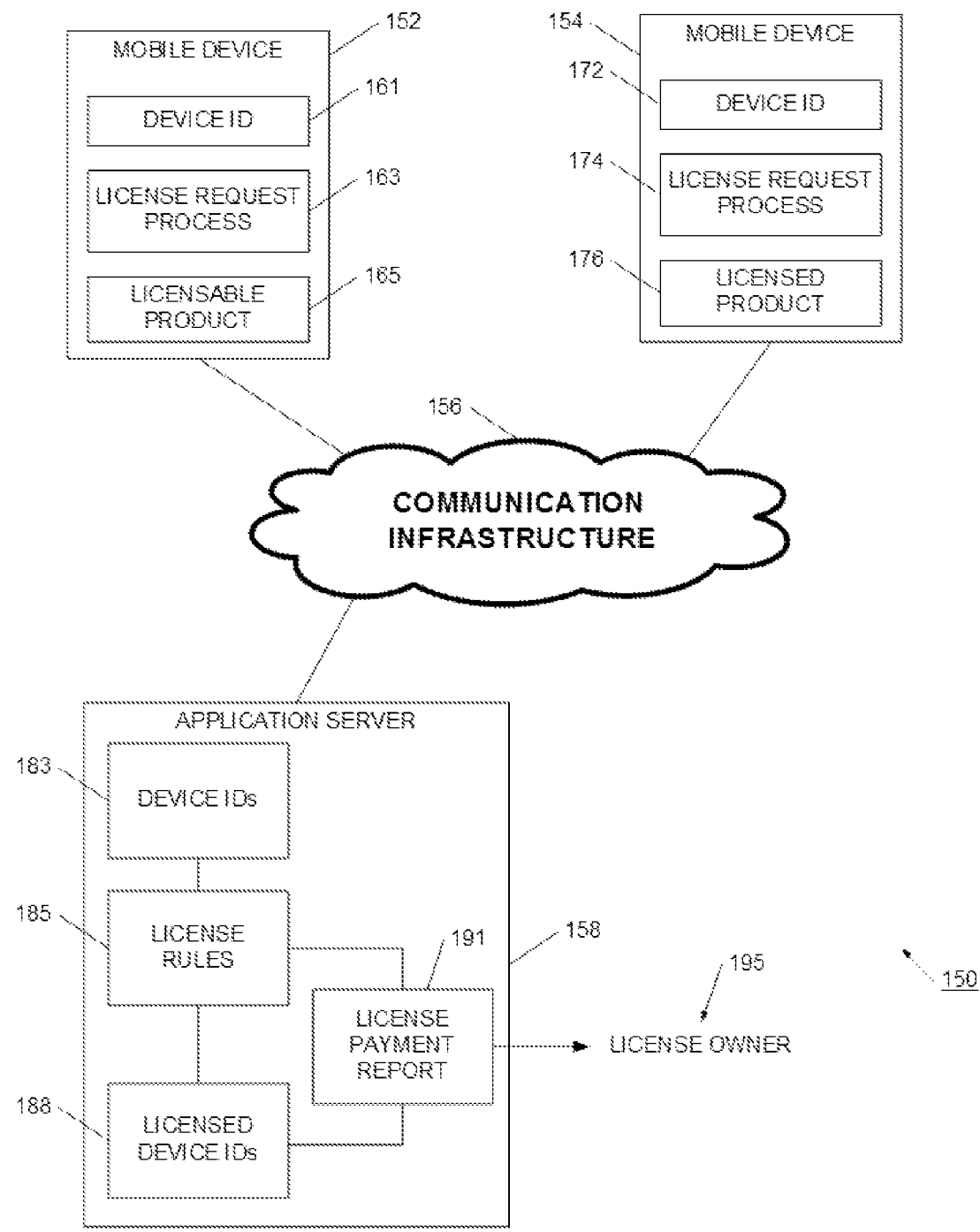
FIG. 4 is a block diagram of a system for licensing a mobile application or device in accordance with the present invention.

Referring now to FIG. 4, a system for licensing an application is illustrated. System 150 has many mobile devices such as mobile device 152 and mobile device 154. The system has communication infrastructure 156 for establishing a communication link between the mobile devices and application licensing server 158. In one example, the communication infrastructure and mobile devices operate according to a communication standard, such as CDMA, WCDMA, CDMA 2000, GSM, UMTS, or another existing or revolving communication standard. It will also be understood that the communication infrastructure and mobile devices may operate according to proprietary government, military, or commercial standards. Each of the mobile devices, such as mobile device 152 has unique device ID 161. Unique device ID is used to enhance security, as well as relate specific operational licenses to a specific mobile device. Each mobile device 152 also includes license request process 163, similar to license request process as described with reference to FIG. 1. Each of the mobile devices has also been manufactured and provided to consumers with licensable product 165. Licensable product 165 is ready for execution and use by the user, however, a fully paid license has not been obtained. Using mobile device 152 as an example, when mobile device 152 first activates licensable product 165, license request process 163 generates a license request and transmits the license request through communication infrastructure 156 to application license server 158. It will be understood that the license request may be made a time period after the user has initiated use of the licensable product. The initial request to operate the licensable product may be made by the user, or it may be made responsive to a remote request. In one example, the licensable product is an MP3 decoder, and the user makes a request by attempting to play an MP3 encoded song. In another example, the licensable product is a video decompression process, and the process is initiated responsive to receiving a video from communication infrastructure 156.

The application license server receives the license request from mobile device 152, and confirms that device ID 161 is included in its list of authorized devices 183. By confirming that mobile device 152 is a properly authorized device, the handset manufacturer or wireless carrier can confirm that they are responsible for paying the license fee for activating licensable product 165. If device ID 161 is not included in device ID list 183, then the license server 158 would not generator a license certificate, and further may generate a command to deactivate licensable product 165. License server 158 also includes license rules 185, which typically have been negotiated with the owners of the underlying intellectual property. These license rules may include, for example, tiered pricing for numbers of activations, or allow the licensable product to be activated in different ways. For example, mobile device 152 may be provided with both an MP3 decoder and an MP3 encoder. The license fee may vary depending on whether one or both of the functions are used.

When the license server has confirmed that the mobile device 152 is properly authorized, and has applied the appropriate license rule, mobile device 152 is indicated on licensed device list 188. Concurrently, application server 158 generates a license certificate to be communicated to mobile device 152. The license certificate may be generated in part using device ID 161. In this way, the specific license certificate generated for mobile device 152 may be used only on that device. Further, correlating device ID with license certificates enables thorough and accurate accounting for license requests and license grants. Since the mobile device 152 is now being licensed to use the licensable product 165, a license payment report 191 is generated. The license payment report may include sending additional funds to the owners of intellectual property, or may indicate another license has been consumed under a prepaid quantity agreement. It will be appreciated that the license arrangement, license recording, and license payment procedures may vary according to commercial needs. In one example, the license payment report along with royalty payments may be forwarded to the license owner 195. Once the license certificate is received at the mobile device, the license certificates are locally stored at the mobile device, and the licensable product becomes fully licensed as shown by licensed product 176. Since mobile device 154 is fully licensed, it no longer needs to use license request process 174 to use licensed product 176. Instead, whenever mobile device 154 desires to use licensed product, the device ID is confirmed to relate to the license certificate, and the licensed product operates.

Figure 5:
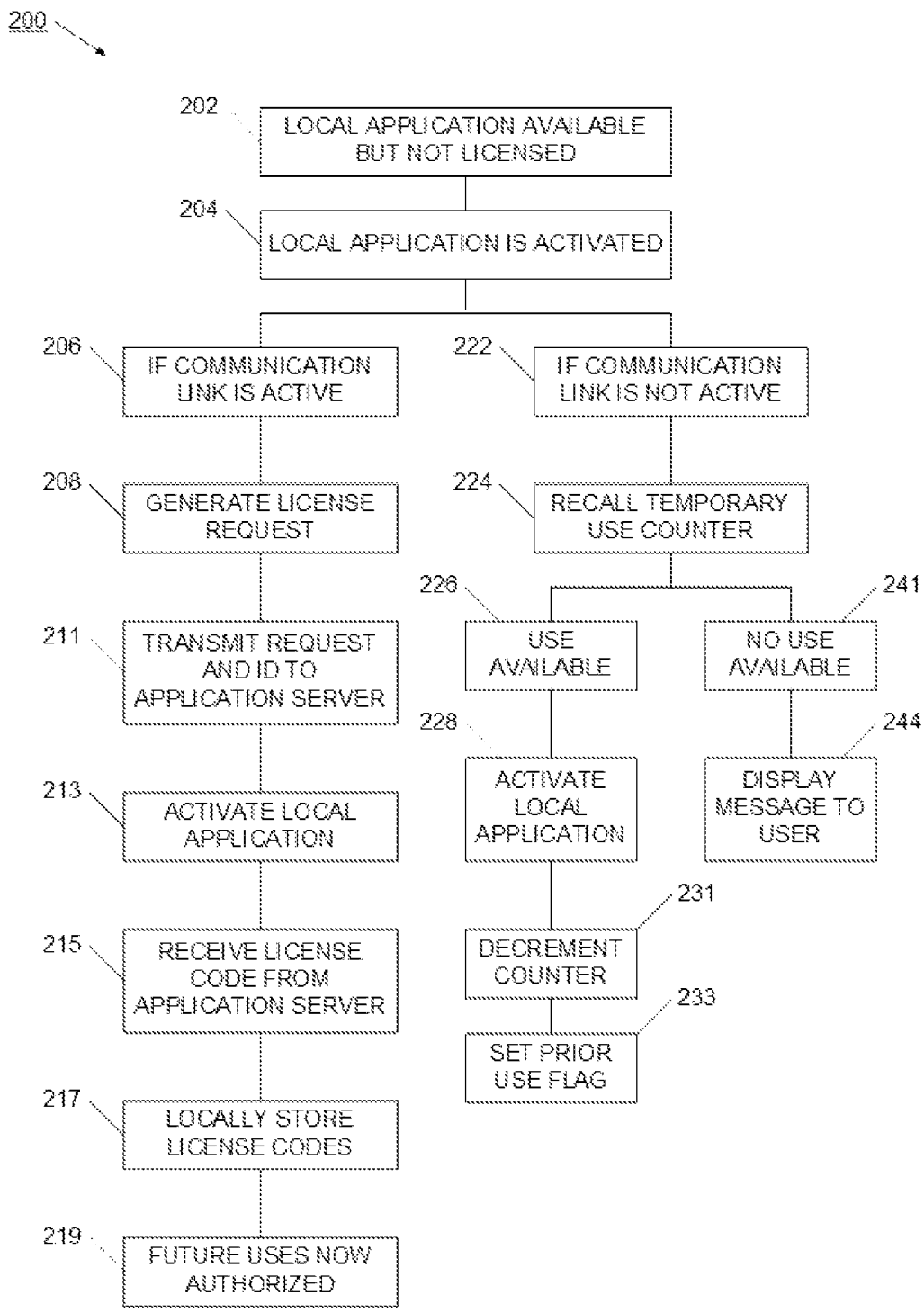
FIG. 5 is a flowchart of a process for licensing a mobile application or device in accordance with the present invention.

Referring now to FIG. 5, a method for licensing and application is illustrated. Method 200 has a local application available but not licensed on a wireless mobile device as shown in block 202. Responsive to a local or a remote request, the local application is activated as shown in block 204. If a radio communication link is active as shown in block 206, then a license request is generated as shown in block 208. The license request is transmitted to a license application server as shown in block 211. As described earlier, the license request may be transmitted using an SMS transport system, and may occur at a later time. The local application, even though not fully licensed, is locally activated as shown in block 213. After the license server has confirmed the eligibility of the wireless device, license certificate or codes are received from the application server as shown in block 215. The mobile device stores these license certificates and codes locally as shown in block 217. In this way, future uses are not authorized and license request steps need not be taken again.

In some cases, when the local application is activated as shown in block 204, the radio communication link may not be active as shown in block 222. If an air interface is not currently available for an extend period of time, the mobile wireless device may recall a temporary use counter as shown in block 224. The temporary use counter allows for temporary or short-term usage of the local application even when communication with the license server is not available. The temporary use counter may indicate that use is available according to the temporary counter as shown in block 226. For example, the temporary use counter may count total minutes that the application has been used, or the number of times that the application has been activated without obtaining a license. Provided use is still available, the local application can be activated as shown in block 228. Of course, the counter will decrement according to block 231. Further, a prior use flag may be set as shown in block 233. This prior use flag may be used to further assure that a proper license is obtained the next time an air interface is obtained. In another example, the prior use flag may be checked each time the mobile device is activated. That way, when the phone is next activated, if the use flag is set then the mobile device may operate the license request process and pay for the use and obtain a license certificate. Sometimes, however, no use will be available in the temporary use counter as shown in block 241. In this case, the display may present a message to the user explaining that the local application is not available and the user should move to a location where an air interface may be obtained so that the license certificate may be downloaded.

Figure 6:
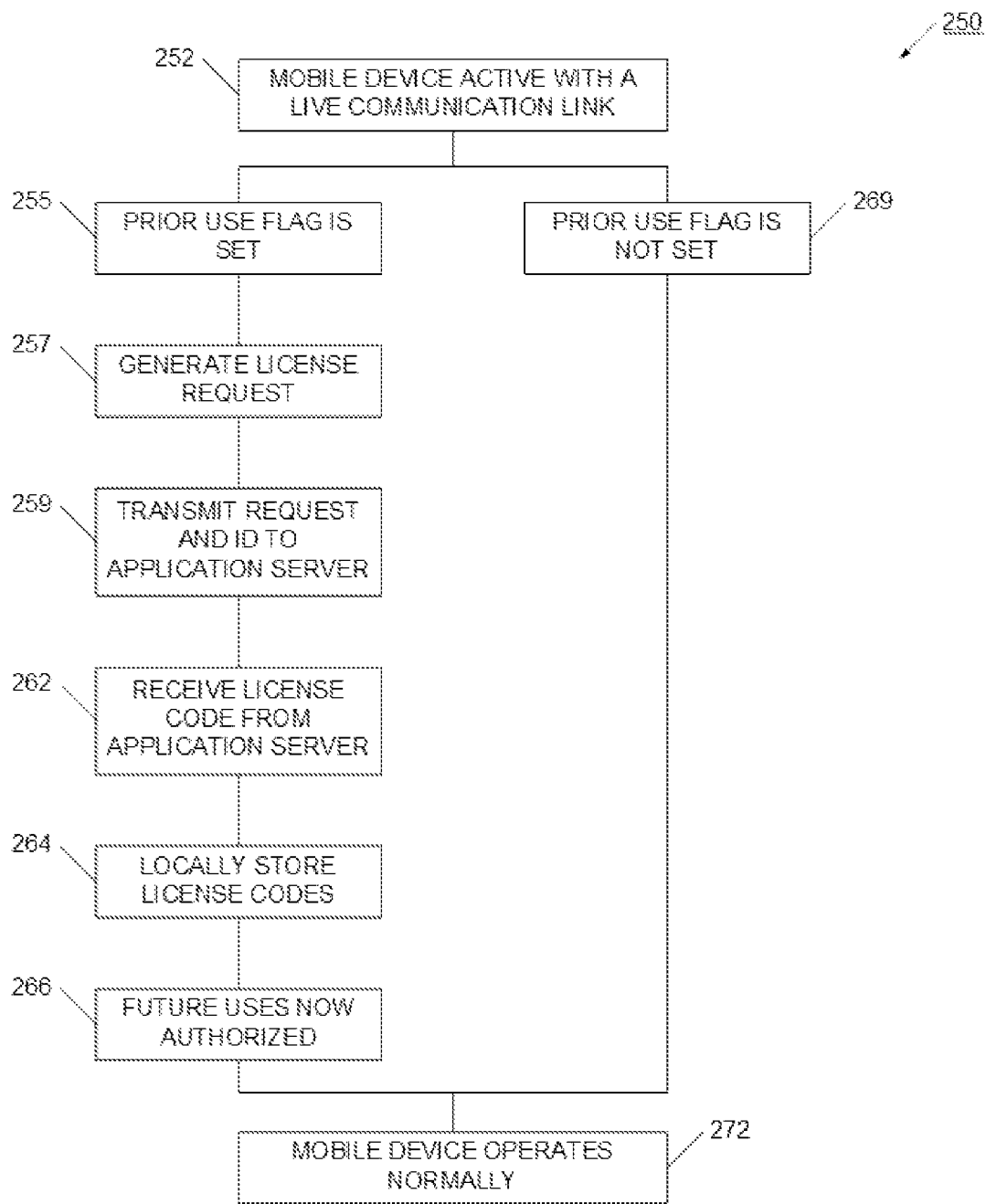
FIG. 6 is a flowchart of a process for licensing a mobile application or device in accordance with the present invention.

Referring now to FIG. 6, a method for licensing an application on a wireless mobile device is described. Method 150 is a continuation of method 200 described with reference to FIG. 5. More particularly, method 250 describes a use for the prior use flag as set in block 233 of FIG. 5. The mobile device is operating and has an active air interface as shown in block 252. It is not necessary that the local application be currently operating. The mobile device checks the prior use flag, and if the use flag is not set as shown in block 269, the mobile device continues to operate normally as shown in block 272. However, if the prior use flag is set as shown in block 255, then the mobile device proceeds to request a license. More particularly, the mobile device generates a license request as shown in block 257. The license request is transmitted to an application server as shown in block 259, for example, using an SMS transport system. After the application server has confirmed that the mobile device is eligible for license, the license server generates a license certificate and transmits the license code or certificate to the mobile device. The mobile device then receives the license certificate or code as shown in block 262. The mobile device stores the local license certificate or code as shown about 264. In this way, when the local application is next activated, the license certificate is locally available and the local application will run as a fully licensed application. After obtaining a license, the mobile device operates normally as shown in block 272. Method 250 shows one example of how a license request may be made irrevocable. It will be appreciated that other processes may be used.

While the invention has been described in connection with a number of embodiments, it is not intended to limit the scope of the invention to the particular forms set forth, but on the contrary, it is intended to cover such alternatives, modifications, and equivalents as may be included within the scope of the invention.

What is claimed is:

1. A method comprising:
    receiving, at a wireless mobile device, a request by a user to use a local application on the wireless mobile device, the local application capable of being licensed for use on the mobile device by obtaining a license from an application server; and
    before any communication with the application server is performed at the wireless mobile device, allowing, when a communication link between the wireless mobile device and the application server is not available, the user to use the local application at the wireless mobile device without any license for the local application.

2. The method according to claim 1, wherein, in the allowing, the user is allowed to use the local application without any restriction to usage of the local application.

3. The method according to claim 1, the method further comprising:
    after the allowing,
    transmitting a request for the license to the application server when the communication link is available; and
    receiving the license from the application server in response to the transmitting.

4. The method according to claim 1, the method further comprising:
    storing, at the wireless mobile device, a threshold;
    after the allowing,
        starting, at the wireless mobile device, a counting period which elapses from when the local application is activated; and
        displaying, at the wireless mobile device, a message that indicates the local application has not been licensed, when the local application is activated again and the application has not been licensed on the wireless mobile device after the counting period exceeds the threshold.

5. The method according to claim 4, the method further comprising:
    restricting, at the mobile terminal device, the user from using the local application, when the local application is activated again and the application has not been licensed on the wireless mobile device after the counting period exceeds the threshold.

6. The method according to claim 3, the method further comprising:
    storing, at the wireless mobile device, the license; and
    skipping, at the wireless mobile device, the transmitting when the local application is activated after the storing.

7. A method comprising:
    receiving, at a wireless mobile device, a request by a user to use a local application on the wireless mobile device, the local application capable of being licensed for use on the mobile device by obtaining a license from an application server; and
    before any communication with the application server is performed at the wireless mobile device, allowing, when a communication link between the wireless mobile device and the application server is not available and any license for the local application has not been verified on the wireless mobile device, the user to use the local application at the wireless mobile device.

8. A wireless mobile device comprising:
    a memory configured to store a local application; and
    a controller configured to:
        receive a request by a user to use the local application on the wireless mobile device, the local application capable of being licensed for use on the mobile device by obtaining a license from an application server; and
        before any communication with the application server is performed at the wireless mobile device, allow, when a communication link between the wireless mobile device and the application server is not available, the user to use the local application at the wireless mobile device without any license for the local application.

9. A non-transitory computer readable medium storing at least a program for operating a wireless mobile device, the medium comprising:
    the at least a program; and an application; and
    wherein the at least a program enables the wireless mobile device to, the program and the application installed in the wireless mobile device:
        receive a request by a user to use the local application on the wireless mobile device, the local application capable of being licensed for use on the mobile device by obtaining a license from an application server; and before any communication with the application server is performed at the wireless mobile device, allow, when a communication link between the wireless mobile device and the application server is not available, the user to use the local application at the wireless mobile device without any license for the local application.

\* \* \* \* \*